United States Patent
Shimizu et al.

(10) Patent No.: US 6,552,515 B2
(45) Date of Patent: Apr. 22, 2003

(54) ENGINE SPEED CONTROLLED GENERATOR SET HAVING AN INVERTER AND DIRECT CURRENT OUTPUT SMOOTHING CAPACITOR

(75) Inventors: Motohiro Shimizu, Saitama (JP); Masashi Nakamura, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/998,199

(22) Filed: Dec. 3, 2001

(65) Prior Publication Data

US 2002/0089311 A1 Jul. 11, 2002

(30) Foreign Application Priority Data

Jan. 5, 2001 (JP) ................................. 2001-311

(51) Int. Cl.⁷ .................... H02H 7/06; H02H 11/00; H02H 9/00; H02P 9/04; H02P 11/00
(52) U.S. Cl. ........................ 322/28; 322/29; 322/38; 322/39; 322/17
(58) Field of Search ...................... 322/14, 15, 17, 322/28, 29, 38, 39

(56) References Cited

U.S. PATENT DOCUMENTS

| | | | | |
|---|---|---|---|---|
| 5,637,985 A | * | 6/1997 | Kakizaki et al. | 322/28 |
| 5,751,069 A | * | 5/1998 | Rajashekara et al. | 290/40 C |
| 5,754,030 A | * | 5/1998 | Maehara et al. | 322/19 |
| 5,886,504 A | * | 3/1999 | Scott et al. | 322/15 |
| 5,998,880 A | * | 12/1999 | Kumar | 290/40 B |
| 6,087,791 A | * | 7/2000 | Maruyama | 318/140 |
| 6,130,486 A | | 10/2000 | Shimizu et al. | 290/40 C |
| 6,175,217 B1 | * | 1/2001 | Da Ponte et al. | 322/19 |
| 6,252,381 B1 | * | 6/2001 | Schenk | 322/28 |
| 6,346,797 B1 | * | 2/2002 | Perreault et al. | 322/29 |
| 6,384,567 B1 | * | 5/2002 | Maeda | 318/801 |
| 6,452,358 B1 | * | 9/2002 | Iijima et al. | 318/727 |
| 6,486,638 B1 | * | 11/2002 | Sumimoto et al. | 322/28 |

FOREIGN PATENT DOCUMENTS

JP 6-121597 4/1994

* cited by examiner

Primary Examiner—Nestor Ramirez
Assistant Examiner—Pedro J. Cuevas
(74) Attorney, Agent, or Firm—Armstrong, Westerman & Hattori, LLP

(57) ABSTRACT

The performance of a generator is improved in a higher range of the output by correcting a decrease in the average direct current voltage supplied to an inverter.

An average calculator calculates an average of direct current voltage inputs to the inverter for comparing with a target voltage (level) VDC. When it is judged by an average voltage deviation detector that the average is smaller by a specific amount than the target voltage level, the target voltage level is increased by an adjusting unit. A conductor angle setting unit determines the conduction angle of thyristors to change the voltage input of the inverter to an adjusted target voltage level VDCm. A thyristor drive circuit controls the conduction of the thyristors in the converter according to the conduction angle.

5 Claims, 3 Drawing Sheets

ENGINE SPEED CONTROLLED GENERATOR SET HAVING AN INVERTER AND DIRECT CURRENT OUTPUT SMOOTHING CAPACITOR

BACKGROUND OF THE INVENTION

1. Field of the Invention

The present invention relates to a generator set having an inverter and, more particularly, to a generator set having an inverter which can be operated at higher efficiency throughout a wider range of revolutions even if the output of an inverter is changed.

2. Description of the Related Art

It is well-known that an engine operated generator for use as an alternating current power source is equipped with an inverter for stabilizing the frequency of its output. FIG. 6 is a block diagram showing an example of a generator set having an inverter. A three-phase alternating current output generated by a generator 100 is converted into direct current form by a rectifier 110 including thyristors and then transferred via a capacitor smoothing unit 120 to an inverter 130. The inverter 130 converts the direct current input into an alternating current output of a commercial frequency. Some generator sets having an inverter with engines are disclosed in Japanese Patent Laid-open Publications (Heisei)11-308896 and 6-121597. As its output frequency hardly depends on the revolution of an engine, the generator set having an inverter can be operated by controlling the revolution of the engine to produce a desired output, that is, an output corresponding to a load.

The generator set having an inverter capable of determining the output of its inverter corresponding to the load, however, exhibits a disadvantage when its rectifying unit is controlled by switching so that the direct current input of the inverter stays not higher than a target voltage level. In case that the generator is a relatively small sized magnetic generator, it may fail to supply the inverter with a power enough to produce a peak of the output. For example, when the inverter is energized by the generator of 3 KW output for producing an output of 2 KVA, its peak output will be 4 KVA. A shortage in the power output of the generator is hence made up for by discharging a capacitance of the capacitor smoothing unit. However, if the capacitance is small, it can hardly make up for the shortage. The direct current voltage to the inverter is controlled so as to not exceed a target level. Because the direct current voltage to the inverter stays not higher than the target level and the capacitance in the capacitor smoothing unit remains small, a compensated level of the direct current voltage will hardly reach the target level, on average.

As a result, the output of the generator at a lower range of voltage may be used even if its level is not enough. In particular, as the generator at a higher revolution fails to produce a desired high level of power output, its operational efficiency will be declined.

This will be explained in more detail.

FIG. 7 illustrates different profiles of the power output of the generator of a magnetic type where the speed is a parameter. As shown, the curves A, B, and C represent the relationship between the current and the voltage output of the generator at H, M, and L (H>M>L) of the speed, respectively. Denoted by Ap, Bp, and Cp are three outputs of the generator at the curves A, B, and C, respectively. For having the output of the inverter adjusted to match a load, the direct current voltage at the input of the inverter is controlled to maintain at a target voltage level V. It is clearly apparent from the diagram that when the direct current voltage at the input of the inverter is maintained at the target voltage level V, the generator at L, M, and H of the speed can produce different outputs denoted by p, q, and r assigned on the curves Ap, Bp, and Cp, respectively.

However, if the average voltage at the input of the inverter remains low, as denoted by V', but does not reach the target voltage level V, the output of the generator may stay at p', q', and r' on the curves Ap, Bp, and Cp.

SUMMARY OF THE INVENTION

It is an object of the present invention to provide a generator set having an inverter which eliminates the foregoing drawback and when the power supply is short, can use a higher range of voltage output of its generator and thus be improved in the operational efficiency.

As a first feature of the present invention, a generator set having a converter composed of semiconductor rectifying devices for rectifying the power output of a magnetic generator, a capacitor smoothing means for smoothing a direct current output of the converter, and an inverter for converting an output of the capacitor smoothing means into an alternating current form at a particular frequency is provided comprising: a semiconductor rectifying device driving means for controlling the conduction of the semiconductor rectifying devices to maintain the smoothed voltage output of the capacitor smoothing means at a target voltage level; an average calculating means for calculating an average of the smoothed voltage output; and a target voltage level adjusting means for increasing the target voltage level when the average is smaller than the target voltage level by a specific amount. As a second feature of the present invention, the average of the smoothed voltage output may be calculated at every output period of the inverter.

These features allow the target voltage level of the smoothed voltage output of the capacitor smoothing means to be increased when its average is reduced by a specific amount from the target voltage level. Then, the smoothed voltage output is modified to the adjusted target voltage level.

As a third feature of the present invention, the generator set having an inverter may further comprise: a conduction rate detecting means for detecting the conduction rate of the semiconductor rectifying devices; and an engine speed controlling means for controlling the speed of an engine to drive the generator so that the conduction rate is converged on a predetermined target rate, wherein the controlling of the speed of the engine is implemented by adjusting the supply of fuel to the engine.

The third feature allows the speed of the engine to be varied throughout a wider range to control the conduction of the semiconductor rectifying devices to a desired rate.

As a fourth feature of the present invention, the engine speed controlling means may be arranged to decrease the revolution of the engine when the deviation of the conduction rate from the target rate is positive and increase the same when negative. As a fifth feature of the present invention, a rate of change of the speed of the engine is greater at a increase than at a decrease thereof.

DETAILED DESCRIPTION OF THE PREFERRED EMBODIMENTS

Figure 1:
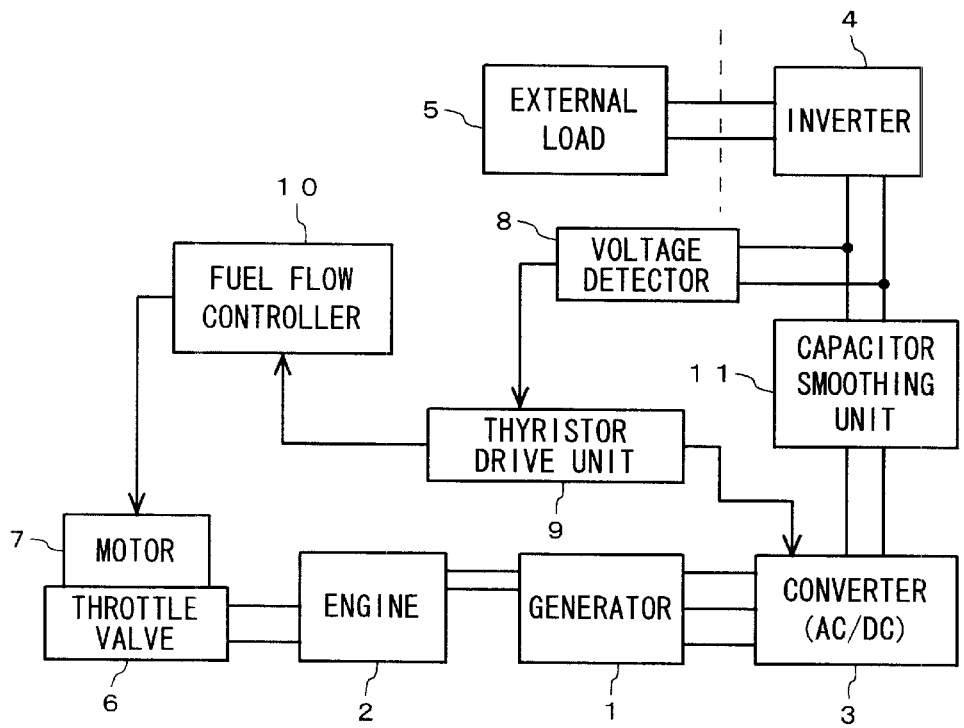
FIG. 1 is a functional block diagram of a generator set having an inverter according to an embodiment of the present invention.

An embodiment of the present invention will be described in more detail referring to the relevant drawings. FIG. 1 is a functional block diagram of a generator set having an inverter. A magnetic type multi-pole generator 1 (referred to as a generator hereinafter) is driven by an (internal combustion) engine 2 to produce a multi-phase (namely three-phase) alternating current output. The alternating current output is full-wave rectified to a direct current form by a converter 3 which comprises a rectifying circuit having thyristors or semiconductor rectifying devices connected in a bridge form. The direct current output is then smoothed by a capacitor smoothing unit 11 and transferred to an inverter 4 which is connected at the output with and supplies an external load 5 with a single-phase alternating current output of a commercial frequency (e.g., 50 Hz). A stepping motor 7 is provided for controlling the opening of a throttle valve 6 of the engine 2. The opening of the throttle valve 6 is adjusted by the number of pulses supplied from a fuel flow controller 10 to the stepping motor 7, hence determining the revolution of the engine 2. The engine 2 maybe of a fuel injection type of which the revolution is controlled by a duration of fuel injection.

A voltage detector 8 detects the voltage output of the capacitor smoothing unit 11. A thyristor drive unit 9 compares the voltage output of the capacitor smoothing unit 11 with a target voltage level (which will be described later in more detail) and determines the conduction of the thyristors in the converter 3 using a known manner so that the voltage output detected by the voltage detector 8 is equal to the target voltage level. By this method, the voltage output of the capacitor smoothing unit 11 or the voltage input to the inverter 4 can be maintained at the target voltage level throughout a controlling range of the conduction angle of the thyristors.

Figure 2:
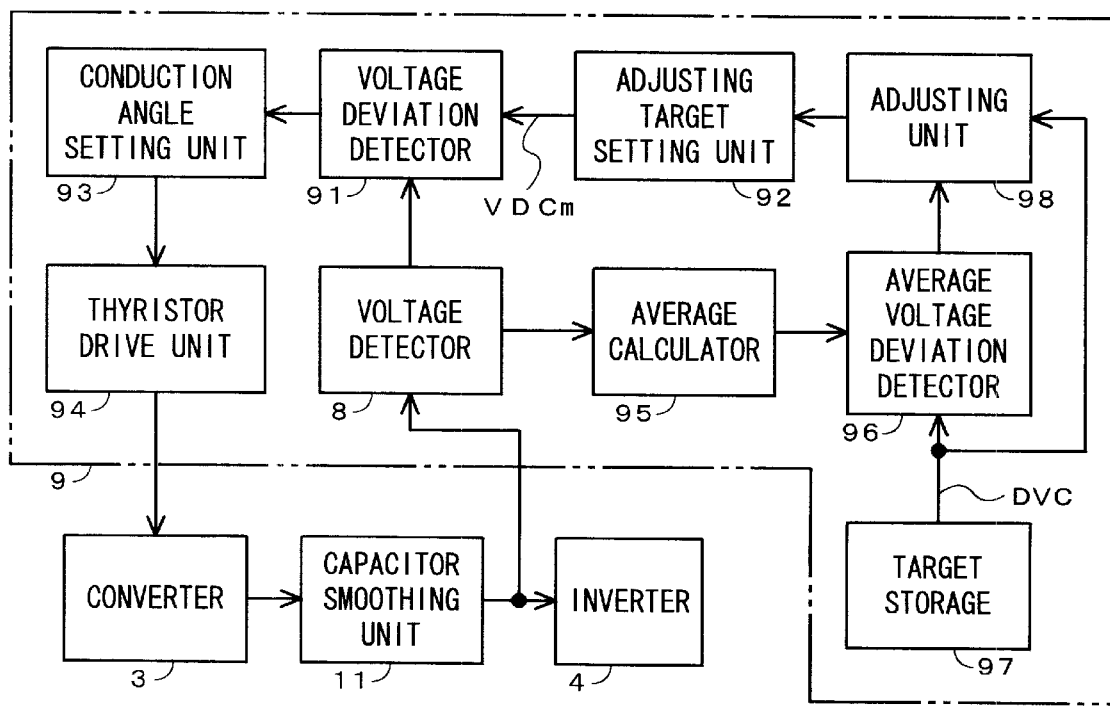
FIG. 2 is a functional block diagram showing a primary part of a thyristor drive unit for modifying the target voltage level.

The target voltage level maybe increased when the average of voltage inputs to the inverter 4 is smaller by a specific amount than the target voltage level. FIG. 2 is a functional block diagram of a primary part of the thyristor drive unit 9 for changing the target voltage level in response to the input voltage average to the inverter 4. In FIG. 2, a voltage deviation detector 91 compares the direct current input from the voltage detector 8, that is, the voltage output of the capacitor smoothing unit 11 with an adjusted target voltage level VDCm determined by an adjusted target setting unit 92 to determine a deviation of the direct current input from the adjusted target voltage level VDCm. A conduction angle setting unit 93 determines the conduction angle for the thyristors in the converter 3 to minimize the deviation of the direct current input. The conduction angle determined is transferred to a thyristor drive circuit 94 which in turn determines the conduction of the thyristors in the converter 3.

The direct current voltage detected by the voltage detector 8 is also received by an average calculator 95 for calculating an average within every duration. The duration may be an output period of the inverter 4. The average is then calculated in every output period of the inverter 4. An average voltage deviation detector 96 compares the average of direct current voltage outputs with the target voltage level VDC stored in a target storage 97 to determine a deviation of the voltage average from the target voltage level. When the target voltage VDC is higher by a specific amount than the average voltage, it is adjusted, for example, by adding a specific value to it by an adjusting unit 98 so that the deviation is minimized. A resultant adjusted target voltage VDCm is then received by the adjusted target setting unit 92.

When the target voltage level DVC is higher by a specific amount than the average of direct current outputs of the capacitor smoothing unit 11, it is adjusted to an adjusted target voltage level VDCm. This allows the generator to be efficiently operated for a higher power output level.

Figure 3:
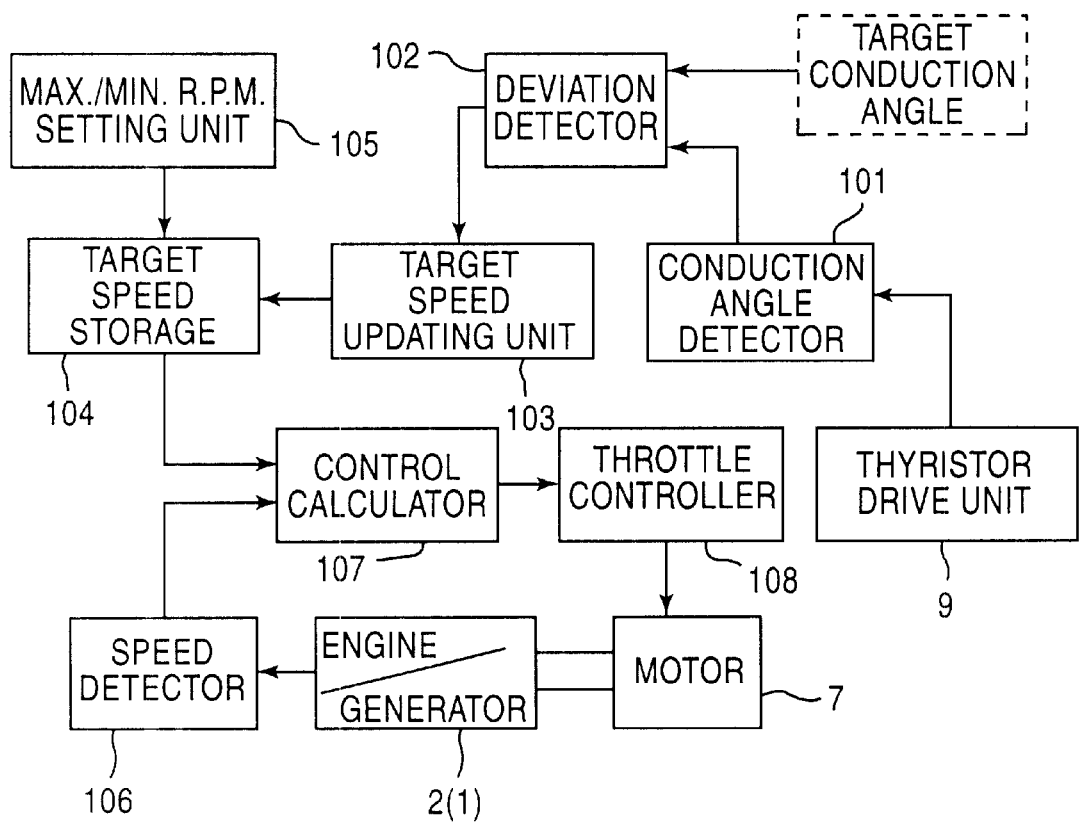
FIG. 3 is a functional block diagram showing a primary part o a fuel flow controller.

The fuel flow controller 10 has a particular arrangement. FIG. 3 is a functional block diagram of a primary part of the fuel flow controller 10. A thyristor conduction angle detector 101 detects a conduction angle of the thyristors from the control signal which is transferred from the thyristor drive unit 93 to the converter 3. The conduction angle is continuously measured throughout the specific period to determine its average. The average conduction angle may preferably be a moving average of consecutive data (e.g., ten times).

The average conduction angle calculated by the thyristor conduction angle detector 101 is transferred to a deviation detector 102 where a deviation of the average conduction angle from a target conduction angle is measured. It is then examined from the deviation whether or not the generator 1 runs with a generous margin. For the purpose, the target conduction angle is set to 80%. Preferably, the target conduction angle, like a common target level used for controlling process, may have a hysteresis. The target conduction angle may be a fixed degree or a variable corresponding to the temperature of the engine 2. For example, when the temperature of the engine 2 is low, the target conduction angle may be decreased. This permits the revolution of the engine 2 to be adjusted to such a value that the deviation measured by the deviation detector 102 is settled down to zero. As a result, the generator 1 can be operated with a generous margin.

Figure 4:
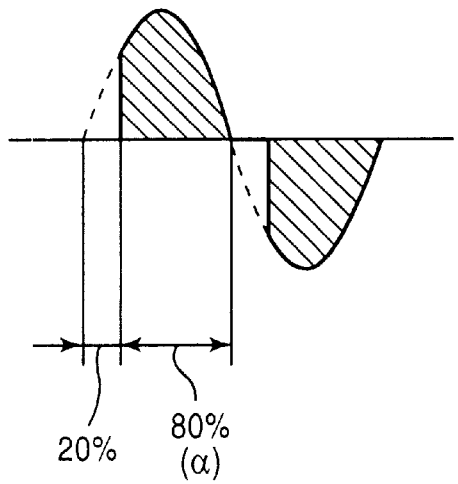
FIG. 4 is an explanatory diagram of the angle of conduction for thyristors.

FIG. 4 illustrates the waveform of a voltage output of thyristors in the converter 3 when the conduction angle is set to 80%. As shown, the conduction angle α is an electrical angle corresponding to the duration of conducting the thyristors which can be determined by a known manner.

For adjusting the revolution from the deviation output of the deviation detector 102, a target revolution updating unit 103 may include a table for determining an adjustment for the speed from the deviation used as a read-out address.

Figure 5:
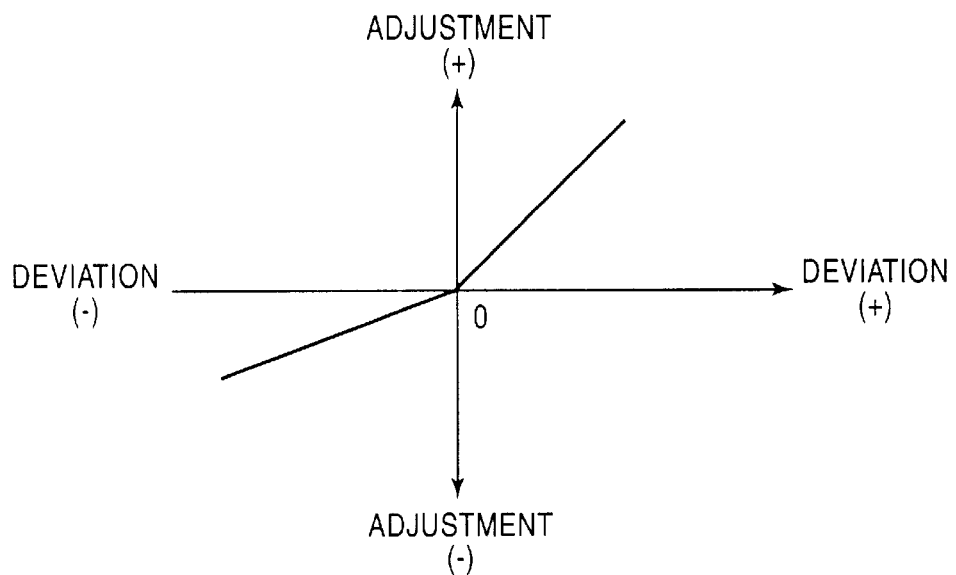
FIG. 5 is a diagram showing the relationship between a deviation of the thyristor conduction angle and an adjustment in the target voltage level.
Figure 6:
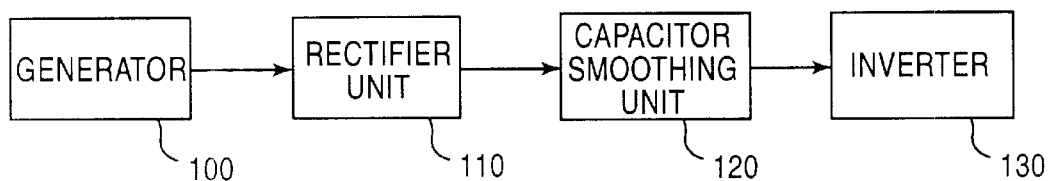
FIG. 6 is a block diagram of a conventional generator set having an inverter.
Figure 7:
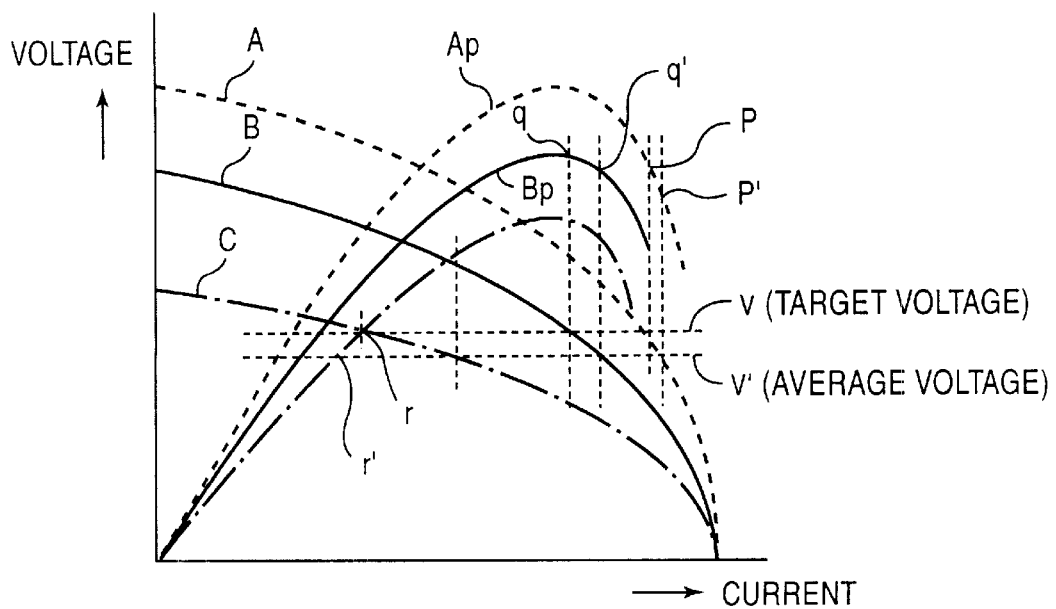
FIG. 7 is a diagram showing a profile of outputs of the magnetic generator.

FIG. 5 illustrates the relationship between the deviation and the adjustment for the speed. The deviation is a difference between the target conduction angle and the actual conduction angle, "actual conduction angle-target conduction angle". In FIG. 5, the rate of adjustment for the speed when the deviation is positive is greater than that when the deviation is negative. This prevents overshooting or frequency changes in the revolution which is caused by the result of over-response. More specifically, when the deviation is a positive value, the conduction angle exceeds its target level (80 %) and it is then judged that the operation of the generator 1 has no margin. This requires the output of the generator 1 to rapidly respond to a change on the load. When the deviation is a negative value, it is judged that the generator 1 is operated with a generous margin.

Returning to FIG. 3, the target speed adjustment value is transferred from the target speed updating unit 103 to the target speed storage 104 where it is added with a target revolution stored so that a resultant sum is an updated target speed. The target speed may be updated without departing a range defined by the maximum and the minimum speed which are set in a maximum/minimum RPM setting unit 105. If the target speed after addition with the target speed adjustment value is out of the range, ether the maximum or minimum of the range will be assigned as the adjusted target speed. The minimum speed is provided for inhibiting the thyristor conduction angle from sensitively responding to a small change in the speed in a low range, hence maintaining the stability of speed when no or small load is applied.

The speed of the generator 1 is measured by a speed detector 106. From the actual speed received from the speed detector 106 and the target speed received from the target speed storage 104, a control calculator 107 calculates a control value such that the deviation of the actual speed from the target speed approaches zero, using a known manner (e.g. comparison, integration, or differentiation). A throttle controller 108 is connected to a stepping motor 7 and responsive to a resultant output of the control calculator 107 for calculating the number of pulses to drive the stepping motor 7. The stepping motor 7 is thus driven by the number of pulses to change the opening of the throttle valve 6.

In the embodiment, the average conduction angle for the thyristor bridged rectifying circuit is favorably controlled to a predetermined level (for example, 80%) by controlling the speed of the engine 2 to determine the output of the converter 3. This allows the generator 1 to constantly supply the load with a redundancy of its power output. More particularly, when the load is increased, the voltage output of the converter 3 declines. In response to a signal of the declination, the conduction angle of the thyristors can be increased to offset an increase in the load. Simultaneously, as the conduction angle increases, the revolution of the engine 2 can be increased gradually but not rapidly. Because the engine is not frequently changed in the speed, its generation of noise and consumption of fuel can successfully be reduced.

Also in the embodiment, the voltage output of the converter is measured at the input of the inverter. This eliminates the need of calculating an optimum revolution of the generator or engine with the use of parameters including the effective power output of the inverter, the conversion efficiency of the inverter, the power output for a revolution, and variations between the components in the generator or the effective power detector, hence facilitating the process of controlling. Moreover, the converter in the embodiment for rectifying the current output of the generator is not limited to the described thyristor bridged type but may be of any other voltage controlled type such as DC—DC voltage conversion type.

As set forth above, the present invention disclosed in claims 1 to 4 allows the target voltage level at the input of the inverter to be increased for optimizing the conduction of semiconductor rectifying devices in the converter when the average of voltage inputs to the inverter is smaller by a specific amount than the target voltage level. As the average of the voltage inputs to the inverter is modified, it is prevented from lowering the power output. Accordingly, the magnetic generator can be improved in the efficiency at a higher range of the output. As the magnetic generator is operated at a higher range of the output, its overall size can be reduced.

Also, when the power supply for the peak of the output of the inverter in response to a change in the load is not compensated by the action of the smoothing capacitor, it can be satisfied without increasing the capacitance. Moreover, the generator can be controlled at high efficiency in the speed.

What is claimed is:

1. A generator set having a converter composed of semiconductor rectifying devices for rectifying the power output of a magnetic generator, a capacitor smoothing means for smoothing a direct current output of the converter, and an inverter for converting an output of the capacitor smoothing means into an alternating current form at a particular frequency, comprising:

a semiconductor rectifying device driving means for controlling the conduction of the semiconductor rectifying devices to maintain the smoothed voltage output of the capacitor smoothing means at a target voltage level;

an average calculating means for calculating an average of the smoothed voltage output; and a target voltage level adjusting means for increasing the target voltage level to raise the average when the average is smaller than the target voltage level by a specific amount.

2. A generator set having an inverter according to claim 1, wherein the average of the smoothed voltage output is calculated at every output period of the inverter.

3. A generator set having an inverter according to claim 1, further comprising:

a conduction rate detecting means for detecting the conduction rate of the semiconductor rectifying devices; and an engine speed controlling means for controlling the speed of an engine to drive the generator so that the conduction rate is converged on a predetermined target rate, wherein the controlling of the speed of the engine is implemented by adjusting the supply of fuel to the engine.

4. A generator set having an inverter according to claim 3, wherein the engine speed controlling means is arranged to decrease the speed of the engine when the deviation of the conduction rate from the target rate is positive and increase the same when negative.

5. A generator set having an inverter according to claim 4, wherein a rate of change of the speed of the engine is greater at a increase than at a decrease thereof.

* * * * *